US008967125B2

(12) United States Patent
Hatano

(10) Patent No.: US 8,967,125 B2
(45) Date of Patent: Mar. 3, 2015

(54) EGR VALVE

(75) Inventor: Makoto Hatano, Nagoya (JP)

(73) Assignee: Aisan Kogyo Kabushiki Kaisha, Obu-Shi (JP)

(*) Notice: Subject to any disclaimer, the term of this patent is extended or adjusted under 35 U.S.C. 154(b) by 445 days.

(21) Appl. No.: 13/428,609

(22) Filed: Mar. 23, 2012

(65) Prior Publication Data
US 2012/0325183 A1 Dec. 27, 2012

(30) Foreign Application Priority Data

Jun. 22, 2011 (JP) ................................. 2011-138355

(51) Int. Cl.
F02M 25/07 (2006.01)
F16K 41/04 (2006.01)

(52) U.S. Cl.
CPC ............ F16K 41/04 (2013.01); F02M 25/0773 (2013.01); F02M 25/0789 (2013.01); Y02T 10/121 (2013.01)
USPC ................................. 123/568.11; 251/129.15

(58) Field of Classification Search
CPC ............ F02M 25/079; F02M 25/0707; F02M 25/0745; F02M 25/0776; F02M 25/0722; F02M 25/0724
USPC ............. 123/568.11, 568.17, 568.21, 568.23, 123/568.2, 568.31, 90.11, 90.37; 251/129.15, 129.12, 214, 318, 330
See application file for complete search history.

(56) References Cited

U.S. PATENT DOCUMENTS 6,089,536 A * 7/2000 Watanabe et al. ........ 251/129.11
6,209,969 B1 * 4/2001 Aumuller et al. .......... 303/116.1
6,672,293 B1 * 1/2004 Yokoyama et al. ...... 123/568.21
7,429,028 B2 * 9/2008 Tanaka et al. .................. 251/214
2001/0032630 A1 * 10/2001 Bircann et al. ............ 123/568.11
2005/0079049 A1 * 4/2005 Ishihara et al. ............. 415/182.1
2005/0082507 A1 * 4/2005 Tanaka et al. .................. 251/318
2005/0098164 A1 * 5/2005 Akao et al. ............... 123/568.24
2006/0071191 A1 * 4/2006 Lyko et al. ..................... 251/214

(Continued)

FOREIGN PATENT DOCUMENTS

JP  A-2005-120932  5/2005
JP  A-2006-090200  4/2006

(Continued)

OTHER PUBLICATIONS

Feb. 14, 2014 Office Action issued in Chinese Application No. 201210212533.7 (with translation).
Japanese Office Action issued in Japanese Application No. 2011-138355 mailed Jun. 24, 2014 (with translation).

Primary Examiner — John Kwon
Assistant Examiner — Johnny H Hoang
(74) Attorney, Agent, or Firm — Oliff PLC

(57) ABSTRACT

A lip seal is placed between a housing and a valve shaft and adjacent to a bearing of the shaft. A deposit-guard plug is placed between the housing and the shaft and adjacent to the lip seal. A first end of the lip seal is placed adjacent to a first end of the bearing. A first end of the plug is placed adjacent to a second end and a lip portion of the lip seal. A second end of the plug is placed to face a passage. A first distance from the first end of the bearing to the leading end of the lip portion of the lip seal and a second distance from the second end of the plug to the leading end of the lip portion of the lip seal are set to be longer than a maximum stroke of the shaft in stroke movement.

8 Claims, 5 Drawing Sheets

(56) References Cited

U.S. PATENT DOCUMENTS

2007/0001136 A1* 1/2007 Everingham et al. ........... 251/77
2010/0270486 A1 10/2010 Kato et al.
2011/0094481 A1 4/2011 Zui et al.
2012/0145134 A1* 6/2012 Miyazaki et al. .......... 123/568.2

FOREIGN PATENT DOCUMENTS

WO WO2009/084131 A1 7/2009
WO WO 2010/018650 A1 2/2010

* cited by examiner

EGR VALVE

CROSS-REFERENCE TO RELATED APPLICATIONS

This application is based upon and claims the benefit of priority from each of the prior Japanese Patent Application No. 2011-138355 filed on Jun. 22, 2011, the entire contents of which are incorporated herein by reference.

TECHNICAL FIELD

The present invention relates to an EGR valve to be placed in an EGR passage of an exhaust gas recirculation apparatus (EGR apparatus) and driven by an actuator.

BACKGROUND ART

As a conventional technique of this type, there are known techniques disclosed in Patent Documents 1 to 3 listed below. Especially, in a housing of an EGR valve disclosed in Patent Document 1, a valve shaft is provided through a bearing and driven to reciprocate (stroke movement) by an actuator to open and close a valve element with respect to a valve seat. A seal member is placed between this valve shaft and the housing to prevent leakage of gas, foreign materials or foreign substances, water, etc. toward the actuator through a gap between the valve shaft and the bearing.

RELATED ART DOCUMENTS

Patent Documents

Patent Document 1: WO2010/18650
Patent Document 2: JP 2005-120932 A
Patent Document 3: JP 2006-90200 A

DISCLOSURE OF THE INVENTION

Problems to be Solved by the Invention

In the EGR valve in Patent Document 1, however, the following problem may be caused in the case where a lip portion of the seal member (i.e., a portion of the seal member contacting with the valve shaft) is not placed in an appropriate position with respect to the stroke movement of the valve shaft. Specifically, when the EGR valve is actually used in the EGR apparatus, deposits may stick to or be accumulated on the valve shaft or a sliding surface of the bearing with respect to the valve shaft. In this case, if such foreign materials or deposits move over the lip portion and thus are caught between the lip portion and the valve shaft, sealing failures are caused in the seal member.

The present invention has been made in view of the above circumstances and has a purpose to provide an EGR valve capable of preventing a sealing failure of a seal member provided on a valve shaft caused by catching of foreign materials or deposits.

Means of Solving the Problems

To achieve the above object, one aspect of the invention provides an EGR valve comprising: a housing having a passage for EGR gas; a valve seat provided in the passage; a valve element being seatable on the valve seat; a valve shaft integrally provided with the valve element to move the valve element with respect to the valve seat; a drive unit for causing the valve shaft together with the valve element to perform a stroke movement in an axial direction; a bearing placed between the housing and the valve shaft to support the valve shaft to allow the stroke movement, the bearing having a first end and a second end in an axial direction; a seal member placed between the housing and the valve shaft and adjacent to the bearing to seal between the housing and the valve shaft, the seal member having a first end and a second end in an axial direction and a seal portion including a leading end on the second end side, the leading end being in contact with the valve shaft; a deposit-guard member placed between the housing and the valve shaft and adjacent to the seal member to protect between the housing and the valve shaft from deposits, the deposit-guard member having a first end and a second end in an axial direction; and the first end of the seal member being placed adjacent to the first end of the bearing, the first end of the deposit-guard member being placed adjacent to the second end and the seal portion of the seal member, and the second end of the deposit-guard member being placed to face the passage, wherein when a distance from the first end of the bearing adjacent to the first end of the seal member to the leading end of the seal portion of the seal member is referred to as a first distance and a distance from the second end of the deposit-guard member facing to the passage to the leading end of the seal portion of the seal member is referred to as a second distance, the first distance and the second distance are set to be longer than a maximum stroke of the stroke movement of the valve shaft.

Effects of the Invention

According to the invention, it is possible to prevent a sealing failure of a seal member provided on a valve shaft of an EGR valve caused by catching of foreign materials or deposits.

MODE FOR CARRYING OUT THE INVENTION

A detailed description of a preferred embodiment of an EGR valve embodying the present invention will now be given referring to the accompanying drawings.

Figure 1:
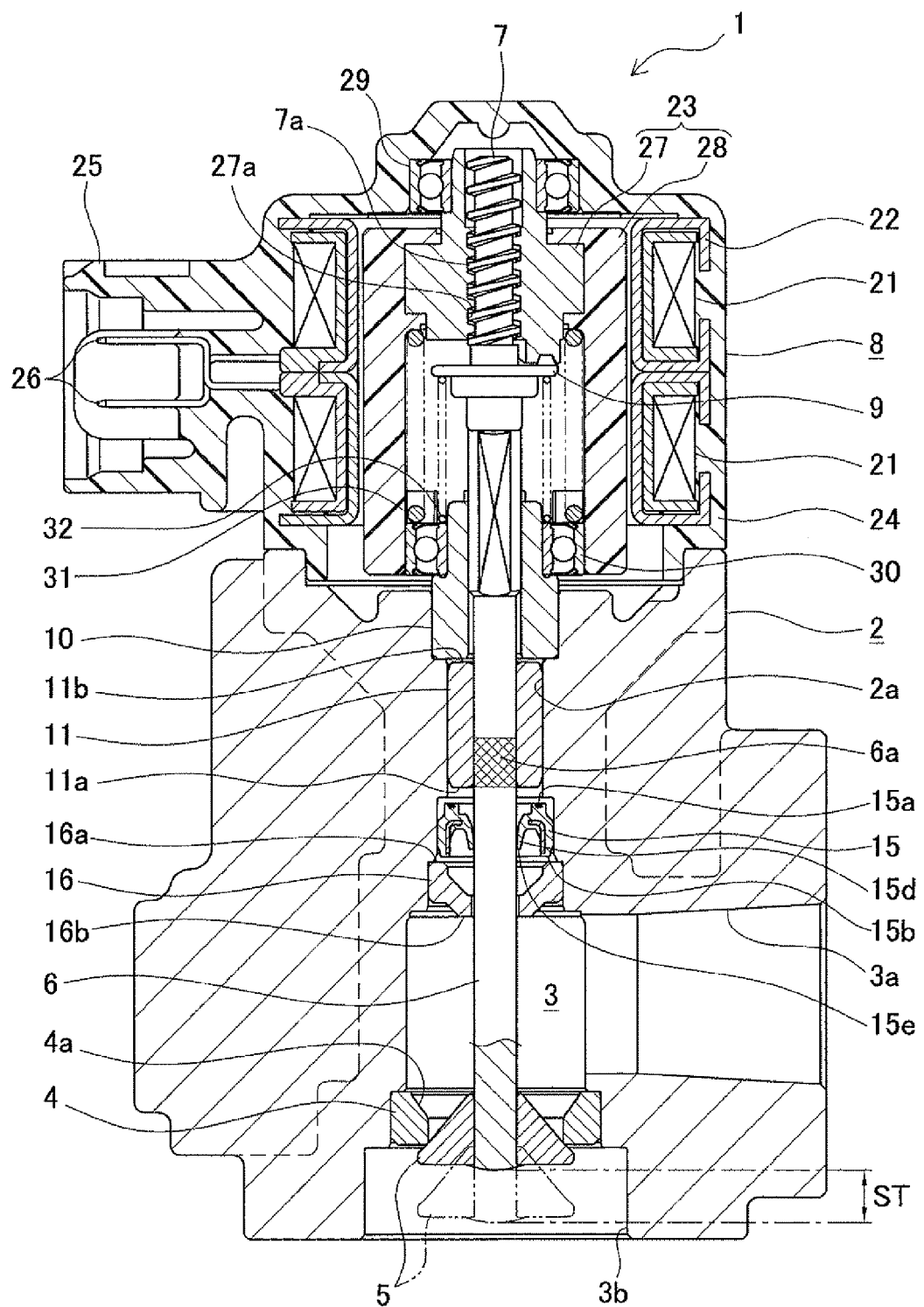
FIG. 1 is a front sectional view showing an EGR valve in a full closed state in an embodiment.
Figure 2:
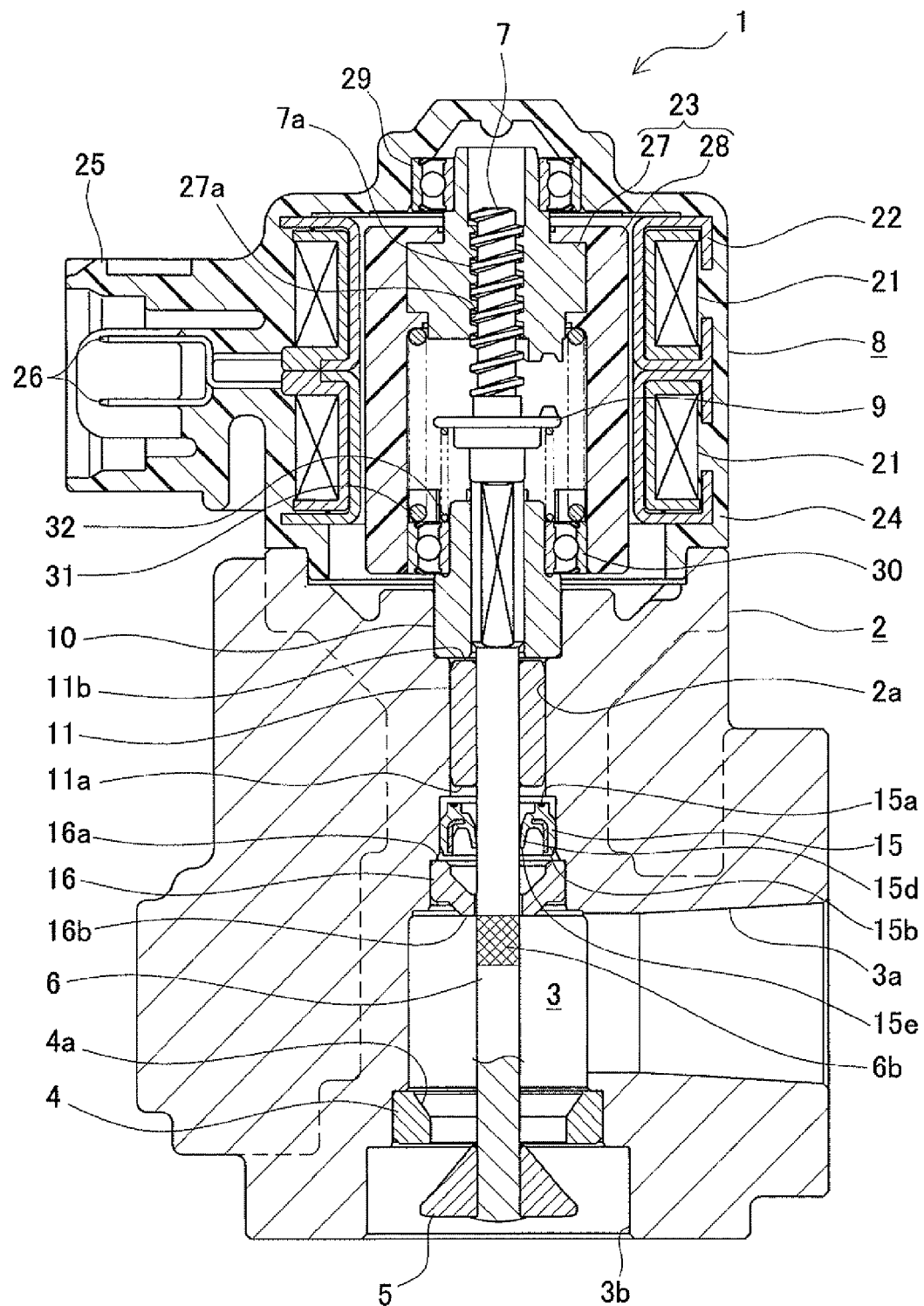
FIG. 2 is a front sectional view showing the EGR valve in a full open state in the embodiment.

FIG. 1 is a front sectional view of an EGR valve 1 in a full closed state. FIG. 2 is a front sectional view of the EGR valve 1 in a full open state. The EGR valve 1 is to be placed in an EGR passage for returning a part (EGR gas) of exhaust gas discharged from an engine to an intake passage, and is used to control a flow rate of the EGR gas. The EGR valve 1 includes a housing 2, a EGR gas passage 3 formed in the housing 2, a valve seat 4 provided at a predetermined position in the passage 3, a valve element 5 provided to be seatable on the valve seat 4, a valve shaft 6 integrally provided with the valve element 5 to move the valve element 5 with respect to the valve seat 4, and an actuator 8 serving as a drive unit for rotating an output shaft 7 to cause the valve shaft 6 to reciprocate (stroke movement) together with the valve element 5 in an axial direction.

Both ends of the passage 3 formed in the housing 2 are used as an inlet 3a for introduction of EGR gas and an outlet 3b for discharge of EGR gas. The valve seat 4 has a valve hole 4a placed at a predetermined position in the passage 3 and communicated with the passage 3.

The valve shaft 6 is placed between the actuator 8 and the valve element 5 so as to extend through the housing 2 vertically in FIGS. 1 and 2. The valve element 5 is fixed to a lower end of the valve shaft 6 and is of a conical shape having a conical surface to be brought into and out of contact with the valve seat 4. A spring bracket 9 is integrally provided at an upper end of the valve shaft 6. Between the housing 2 and the valve shaft 6, a first thrust bearing 10 and a second thrust bearing 11 are axially arranged in series to support the valve shaft 6 so that the valve shaft 6 is allowed to perform a stroke movement. Each of the thrust bearings 10 and 11 has an approximate cylindrical shape and fixedly fitted in a mounting hole 2a formed in the center of the housing 2. The second thrust bearing 11 has a first end 11a and a second end 11b in an axial direction. The first end 11a is located on a lower side in FIGS. 1 and 2 and the second end 11b is located on an upper side in FIGS. 1 and 2 and adjacent to the first thrust bearing 10.

The actuator 8 includes a stator 22 with coils 21, a magnet rotor 23 placed inside the stator 22, and the output shaft 7 placed to extend axially in the center of the magnet rotor 23. Those components 7, 21 to 23, and others are covered with a resin casing 24 by molding. The casing 24 is integrally formed with a connector 25 protruding sideways. This connector 25 is provided with terminals 26 extending from the coils 21.

The output shaft 7 has a male screw 7a on an outer periphery. A lower end portion of the output shaft 7 is joined to the spring bracket 9 provided at the top end of the valve shaft 6. The magnet rotor 23 includes a rotor body 27 and a cylindrical plastic magnet 28 integrally provided on an outer periphery of the rotor body 27. A first radial bearing 29 is placed between an outer periphery of an upper end portion of the rotor body 27 and the casing 24. Further, a second radial bearing 30 is placed between an inner periphery of a lower end portion of the plastic magnet 28 and the first thrust bearing 10. With those upper radial bearing 29 and lower radial bearing 30, the magnet rotor 23 is rotatably supported inside the stator 22. The rotor body 27 is formed, in its center, with a female screw 27a threadably engaged with the male screw 7a of the output shaft 7. A first compression spring 31 is placed between the magnet rotor 23 and the second radial bearing 30 at the lower side. A second compression spring 32 is placed between the spring bracket 9 at the upper end portion of the valve shaft 6 and the second radial bearing 30 to urge the valve shaft 6 toward the magnet rotor 23.

As indicated by a solid line in FIG. 1, in the full closed state where the valve element 5 is seated on the valve seat 4, the magnet rotor 23 is rotated in one way, the output shaft 7 performs a stroke movement in a downward direction in FIG. 1 which is a thrust direction while the shaft 7 is being rotated in the one way against the urging force of the second compression spring 32 by the threaded engagement relation between the male screw 7a of the output shaft 7 and the female screw 27a of the rotor body 27. By this stroke movement of the output shaft 7, the valve element 5 performs the stroke movement together with the valve shaft 6 in the downward direction in FIG. 1 to move away from the valve seat 4, establishing a valve open state.

On the other hand, as shown in FIG. 2, in the full open state where the valve element 5 is furthest away from the valve seat 4, when the magnet rotor 23 is rotated in a reverse direction, the output shaft 7 performs the stroke movement in an upward direction in FIG. 2 which is the thrust direction while the output shaft 7 is being rotated in the reverse direction by the urging force of the second compression spring and by the threaded engagement relation between the male screw 7a of the output shaft 7 and the female screw 27a of the rotor body 27. By this stroke movement of the output shaft 7, the valve element 5 performs the stroke movement together with the valve shaft 6 in the upward direction in FIG. 2 to move close to the valve seat 4, establishing a valve closed state.

Figure 3:
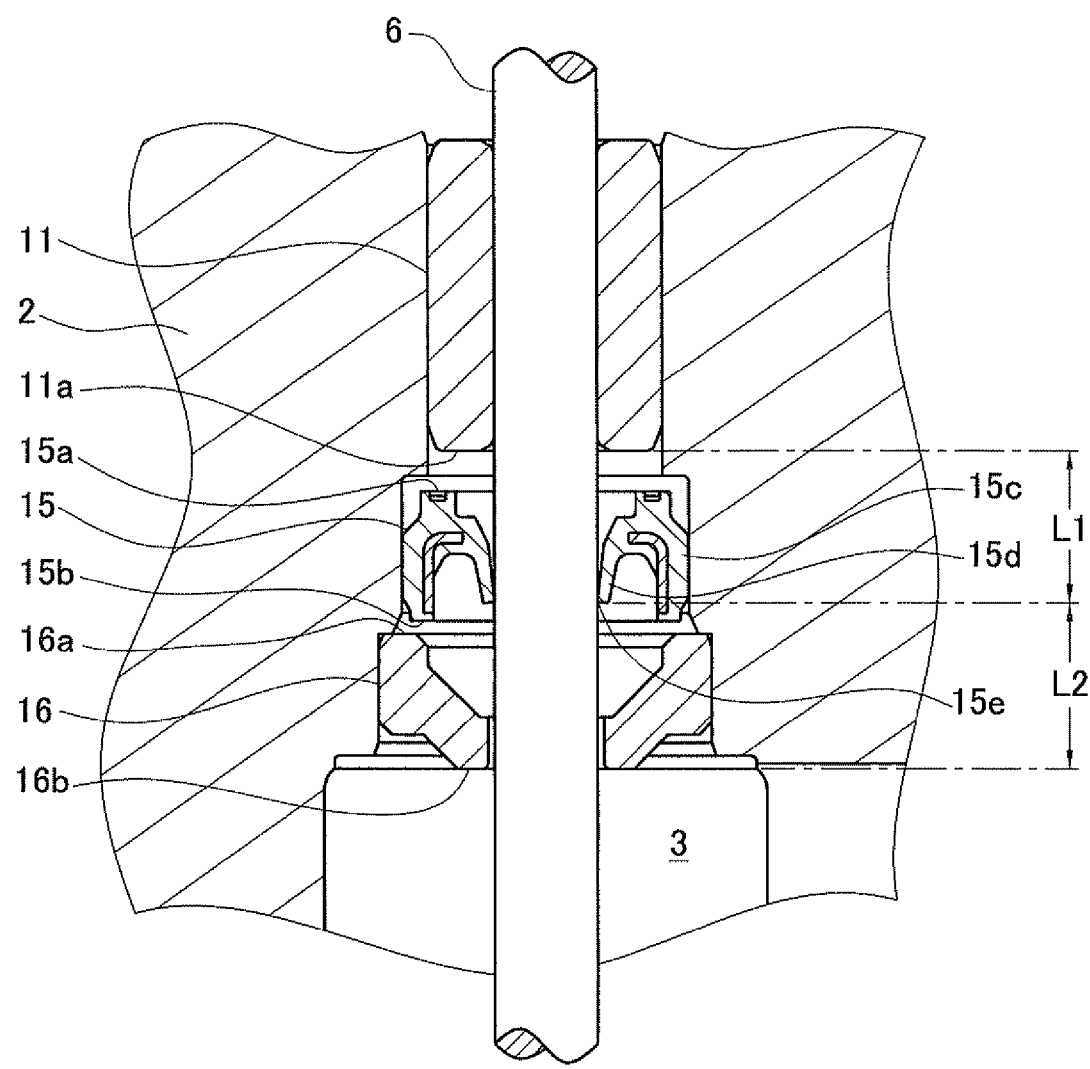
FIG. 3 is an enlarged sectional view showing a main part in FIGS. 1 and 2 in the embodiment.
Figure 4:
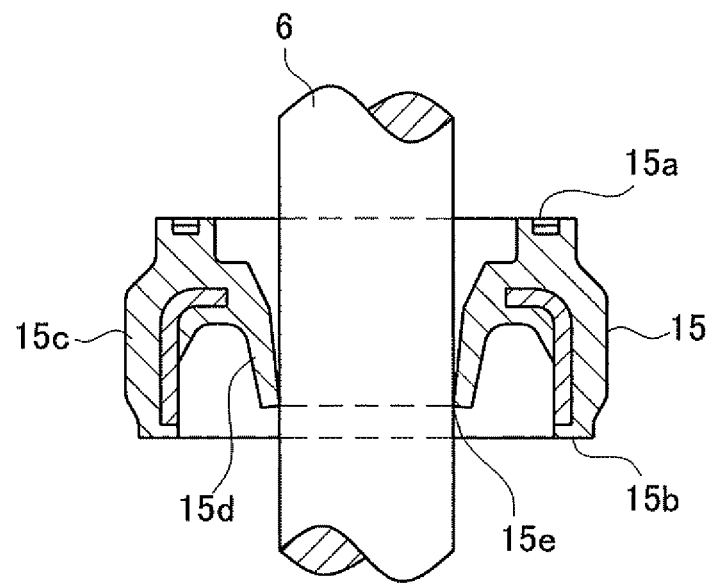
FIG. 4 is a sectional view showing a lip seal and a part of a valve shaft in the embodiment.

FIG. 3 is an enlarged sectional view of a main part in FIGS. 1 and 2. As shown in FIGS. 1 to 3, between the housing 2 and the valve shaft 6, a lip seal 15 is provided adjacent to the second thrust bearing 11 and serves as a seal member for sealing between the housing 2 and the valve shaft 6. This lip seal 15 has an approximate cylindrical shape having a first end 15a and a second end 15b in an axial direction. FIG. 4 is a sectional view showing the lip seal 15 together with a part of the valve shaft 6. As shown in FIGS. 1 to 3, the lip seal 15 is directly press-fitted in the mounting hole 2a formed in the housing 2 so that the valve shaft 6 extends through the center of the lip seal 15. As shown in FIG. 4, the lip seal 15 in the present embodiment has a double-cylindrical structure and includes an outer cylindrical portion 15c and an inner lip portion 15d serving as a seal part. In the present embodiment, the first end 15a and the second end 15b of the lip seal 15 also correspond to a first end 15a and a second end 15b of the cylindrical portion 15c respectively. In contrast, a leading end 15e of the lip portion 15d is located on the same side as and adjacent to the second end 15b of the outer cylindrical portion 15c in the axial direction. Herein, the leading end 15e of the lip portion 15d represents a leading end from which the lip portion 15d begins contacting with the outer periphery of the valve shaft 6. In the present embodiment, as one example, the leading end 15e of the lip portion 15d is placed more inside the lip seal 15 than the second end 15b of the lip seal 15 in the axial direction, so that the leading end 15e of the lip portion 15d is not located at a position axially corresponding to a position of the second end 15b of the lip seal 15.

Figure 5:
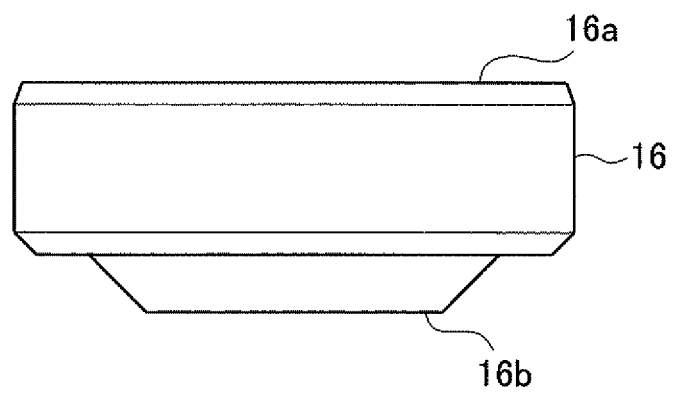
FIG. 5 is a front view of a deposit-guard plug in the embodiment.

As shown in FIGS. 1 to 3, furthermore, between the housing 2 and the valve shaft 6, a deposit-guard plug 16 as a deposit-guard member for protecting between the housing 2 and the valve shaft 6 from deposits is provided adjacent to the lip seal 15. This deposit-guard plug 16 has an approximate cylindrical shape and includes a first end 16a and a second end 16b in an axial direction. FIG. 5 is a front view of the deposit-guard plug 16. As shown in FIGS. 1 to 3, and 5, the deposit-guard plug 16 is designed to convex toward the passage 3 on the second end 16b side facing the passage 3. This plug 16 is formed at its center with a through hole through which the valve shaft 6 is inserted.

Herein, the first end 15a of the lip seal 15 is located adjacent to the first end 11a of the second thrust bearing 11. The first end 16a of the deposit-guard plug 16 is located adjacent to the second end 15b of the lip seal 15 and the leading end 15e of the lip portion 15d. Further, the second end 16b of the deposit-guard plug 16 is located to face the passage 3. As shown in FIG. 3, the second thrust bearing 11, the lip seal 15, and the deposit-guard plug 16 are arranged with respect to the valve shaft 6 based on the following relationship. Specifically, a distance from the first end 11a of the second thrust bearing 11 adjacent to the first end 15a of the lip seal 15 to the leading end 15e of the lip portion 15d of the lip seal 15 is referred to as a first distance L1. A distance from the second end 16b of the deposit-guard plug 16 facing the passage 3 to the leading end 15e of the lip portion 15d of the lip seal 15 is referred to as a second distance L2. Those first distance L1 and second distance L2 are determined to be longer than a maximum stroke ST (see FIG. 1) of the stroke movement of the valve shaft 6. In other words, this determination is made to establish the relationship of "L1>ST" and "L2>ST". The maximum stroke ST of the valve shaft 6 corresponds to the distance in a vertical direction from the position of the lower end of the valve shaft 6 in the full closed state of the valve element 5 indicated by the solid line in FIG. 1 to the position of the lower end of the valve shaft 6 in the full open state of the valve element 5 indicated by a chain double-dashed line in FIG. 1. In the present embodiment, as one example, the above conditions can be set to "L1=L2=6 mm" and "ST=5 mm".

According to the EGR valve 1 in the present embodiment explained above, the first distance L1 from the first end 11a of the second thrust bearing 11 adjacent to the first end 15a of the lip seal 15 to the leading end 15e of the lip portion 15d of the lip seal 15 is set to be longer than the maximum stroke ST of the valve shaft 6. Accordingly, as shown in FIG. 1, from the full closed state of the valve element 5 with respect to the valve seat 4, the valve shaft 6 is moved downward together with the valve element 5 by the maximum stroke ST as the stroke movement by the actuator 8. At that time, the valve shaft 6 is moved by the maximum stroke ST from the second thrust bearing 11 side toward the lip seal 15 side. However, a sliding portion (a cross-hatched portion in FIG. 1) 6a of the valve shaft 6 with respect to the second thrust bearing 11 does not reach the leading end 15e of the lip portion 15d of the lip seal 15. Specifically, the sliding portion 6a does not pass through the leading end 15e of the lip portion 15d of the lip seal 15. Accordingly, even when foreign materials stick to the sliding portion 6a, those foreign materials are not caught by the lip portion 15d of the lip seal 15. In the present embodiment, the second distance L2 from the second end 16b of the deposit-guard plug 16 facing the passage 3 to the leading end 15e of the lip portion 15d of the lip seal 15 is set to be longer than the maximum stroke ST of the valve shaft 6. Accordingly, as shown in FIG. 2, from the full open state of the valve element 5 with respect to the valve seat 4, the valve shaft 6 is moved upward together with the valve element 5 by the maximum stroke ST as the stroke movement by the actuator 8. At that time, the valve shaft 6 is moved by the maximum stroke ST from the deposit-guard plug 16 side toward the lip seal 15 side. An exposed portion (a cross-hatched portion in FIG. 2) 6b of the valve shaft 6 exposed in the passage 3 does not reach the leading end 15e of the lip portion 15d of the lip seal 15. Specifically, the exposed portion 6b does not pass through the leading end 15e of the lip portion 15d of the lip seal 15. Accordingly, even when deposits stick to the exposed portion 6b, those deposits are not caught by the lip portion 15d of the lip seal 15. It is therefore possible to prevent sealing failures caused by foreign materials or deposits caught by the lip seal 15 provided on the valve shaft 6. Further, abrasion of the lip seal 15 due to the foreign materials and deposits can be reduced. This enhances robustness of the lip seal 15 in the EGR valve 1.

In the present embodiment, the deposit-guard plug 16 on the second end 16b side facing the passage 3 is convex toward the passage 3. Thus, the deposits flowing in the passage 3 are less likely to enter between the deposit-guard plug 16 and the valve shaft 6. This makes it possible to further restrain entrance of deposits between the valve shaft 6 and the lip seal 15. Since the deposit-guard plug 16 is designed to be convex on the second end 16b side, the length of the plug 16 in the axial direction is long by just that much for such a convex shape. By variously designing this convex shape, the above second distance L2 is adjusted.

In the present embodiment, the lip seal 15 is directly press-fitted in the mounting hole 2a of the housing 2, and the valve shaft 6 extends through the center of the lip seal 15. Accordingly, the sealing property between the housing 2 and the lip seal 15 is kept and also the coaxiality between the valve shaft 6 and the lip seal 15 is maintained. From this viewpoint, the sealing property of the lip seal 15 can also be further enhanced.

The present invention is not limited to the above embodiment and may be embodied in other specific forms without departing from the essential characteristics thereof.

Figure 6:
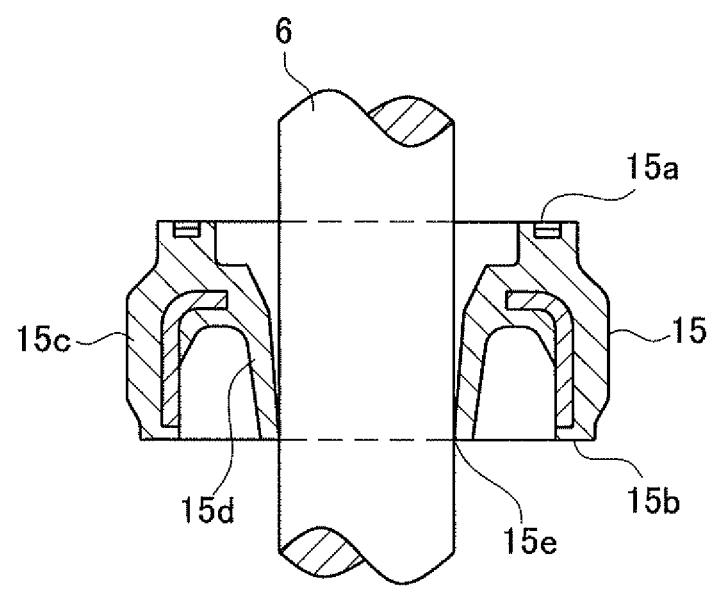
FIG. 6 is a sectional view showing a lip seal and a part of a valve shaft in another embodiment.

In the above embodiment, the lip seal 15 is configured as the double-cylindrical structure in which the leading end 15e of the inner lip portion 15d is placed more inside the lip seal 15 than the second end 15b of the lip seal 15 in the axial direction so that the position of the leading end 15e of the lip portion 15d does not correspond to that of the second end 15b of the lip seal 15 in the axial direction. In contrast, as shown in FIG. 6, the lip seal 15 may be configured as a double-cylindrical structure in which the leading end 15e of the lip portion 15d is located at a position corresponding to a position of the second end 15b of the lip seal 15 in the axial direction.

The shape of the lip seal 15 and the shape of the deposit-guard plug 16 in the above embodiment are not limited to the shapes shown in FIGS. 1 to 5 and may be appropriately modified.

While the presently preferred embodiment of the present invention has been shown and described, it is to be understood that this disclosure is for the purpose of illustration and that various changes and modifications may be made without departing from the scope of the invention as set forth in the appended claims.

INDUSTRIAL APPLICABILITY

The present invention can be applied to an EGR valve to be used in an EGR apparatus of a vehicle engine.

DESCRIPTION OF THE REFERENCE SIGNS

1 EGR valve
2 Housing
2a Mounting hole
3 Passage
4 Valve seat
5 Valve element
6 Valve shaft
8 Actuator
11 Second thrust bearing
  11a First end
15 Lip seal
15a First end
15b Second end
15d Lip portion
15e Leading end
16 Deposit-guard plug
16a First end
16b Second end
L1 First distance
L2 Second distance
ST Maximum stroke

The invention claimed is:

1. An EGR valve comprising:
   a housing having a passage for EGR gas;
   a valve seat provided in the passage;
   a valve element being seatable on the valve seat;
   a valve shaft integrally provided with the valve element to move the valve element with respect to the valve seat;
   a drive unit for causing the valve shaft together with the valve element to perform a stroke movement in an axial direction;
   a bearing placed between the housing and the valve shaft to support the valve shaft to allow the stroke movement, the bearing having a first end and a second end in an axial direction;
   a seal member placed between the housing and the valve shaft and adjacent to the bearing to seal between the housing and the valve shaft, the seal member having a first end and a second end in an axial direction and a seal portion including a leading end on the second end side, the leading end being in contact with the valve shaft;
   a deposit-guard member placed between the housing and the valve shaft and adjacent to the seal member to protect between the housing and the valve shaft from deposits, the deposit-guard member having a first end and a second end in an axial direction; and
   the first end of the seal member being placed adjacent to the first end of the bearing, the first end of the deposit-guard member being placed adjacent to the second end of the seal portion of the seal member, and the second end of the deposit-guard member being placed to face the passage,
   wherein:
   the deposit-guard member is inserted on the valve shaft with a clearance from the valve shaft; and
   when a distance from the first end of the bearing adjacent to the first end of the seal member to the leading end of the seal portion of the seal member is referred to as a first distance and a distance from the second end of the deposit-guard member facing to the passage to the leading end of the seal portion of the seal member is referred to as a second distance, the first distance and the second distance are set to be longer than a maximum stroke of the stroke movement of the valve shaft.

2. The EGR valve according to claim 1, wherein the deposit-guard member has an approximate cylindrical shape designed to be convex toward the passage on the second end side facing the passage, and the valve shaft extends through a center of the deposit-guard member.

3. The EGR valve according to claim 1, wherein the seal member has an approximate cylindrical shape and is directly press-fitted in a hole formed in the housing, and the valve shaft extends through a center of the seal member.

4. The EGR valve according to claim 2, wherein the seal member has an approximate cylindrical shape and is directly press-fitted in a hole formed in the housing, and the valve shaft extends through a center of the seal member.

5. The EGR valve according to claim 3, wherein
   the seal member has a double-cylindrical structure including an outer cylindrical portion and the inner seal portion,
   the first end and the second end of the seal member are a first end and a second end of the cylindrical portion,
   the leading end of the seal portion is placed adjacent to the second end of the outer cylindrical portion, the leading end is a leading end from which the seal portion begins contacting with an outer periphery of the valve shaft, and the leading end is placed more inside the seal member than the second end of the seal member.

6. The EGR valve according to claim 4, wherein
   the seal member has a double-cylindrical structure including an outer cylindrical portion and the inner seal portion,
   the first end and the second end of the seal member are a first end and a second end of the cylindrical portion,
   the leading end of the seal portion is placed adjacent to the second end of the outer cylindrical portion, the leading end is a leading end from which the seal portion begins contacting with an outer periphery of the valve shaft, and the leading end is placed more inside the seal member than the second end of the seal member.

7. The EGR valve according to claim 3, wherein
   the seal member has a double-cylindrical structure including an outer cylindrical portion and the inner seal portion,
   the first end and the second end of the seal member are a first end and a second end of the cylindrical portion,
   the leading end of the seal portion is placed adjacent to the second end of the outer cylindrical portion, the seal portion is a leading end from which the seal portion begins contacting with an outer periphery of the valve shaft, and the leading end is placed at a position corresponding to a position of the second end of the seal member in an axial direction.

8. The EGR valve according to claim 4, wherein
   the seal member has a double-cylindrical structure including an outer cylindrical portion and the inner seal portion,
   the first end and the second end of the seal member are a first end and a second end of the cylindrical portion,
   the leading end of the seal portion is placed adjacent to the second end of the outer cylindrical portion, the seal portion is a leading end from which the seal portion begins contacting with an outer periphery of the valve shaft, and the leading end is placed at a position corresponding to a position of the second end of the seal member in an axial direction.

* * * * *